United States Patent
Addison et al.

(10) Patent No.: US 9,015,006 B2
(45) Date of Patent: Apr. 21, 2015

(54) AUTOMATED ENABLEMENT OF PERFORMANCE DATA COLLECTION

(75) Inventors: Edward A. Addison, Raleigh, NC (US); Peggy A. DeVal, Raleigh, NC (US); Philip R. Lee, Winchester (GB); Andrew Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 13/350,608

(22) Filed: Jan. 13, 2012

(65) Prior Publication Data

US 2013/0185021 A1 Jul. 18, 2013

(51) Int. Cl.
*G06F 11/34* (2006.01)
*G06F 11/07* (2006.01)

(52) U.S. Cl.
CPC ........ *G06F 11/3428* (2013.01); *G06F 11/0709* (2013.01); *G06F 11/079* (2013.01); *G06F 11/3476* (2013.01); *G06F 2201/87* (2013.01)

(58) Field of Classification Search
CPC .............................. G06F 15/00; G06F 11/3428
USPC ......................................................... 702/186
See application file for complete search history.

(56) References Cited

U.S. PATENT DOCUMENTS

| | | | |
|---|---|---|---|
| 7,480,647 B1 * | 1/2009 | Murstein et al. | 1/1 |
| 7,890,934 B2 | 2/2011 | Hall | |
| 8,667,473 B2 * | 3/2014 | Goossen et al. | 717/131 |
| 2006/0195731 A1 | 8/2006 | Patterson et al. | |
| 2007/0150871 A1 * | 6/2007 | Barsness et al. | 717/128 |
| 2008/0034082 A1 | 2/2008 | McKinney | |
| 2008/0126873 A1 | 5/2008 | Cocker et al. | |
| 2008/0263556 A1 * | 10/2008 | Zoll et al. | 718/104 |
| 2008/0307269 A1 * | 12/2008 | Bennett et al. | 714/47 |
| 2009/0105982 A1 * | 4/2009 | Sarig et al. | 702/108 |
| 2009/0228587 A1 | 9/2009 | Chagoly et al. | |
| 2009/0312983 A1 * | 12/2009 | Lee et al. | 702/180 |
| 2011/0072310 A1 | 3/2011 | Lee et al. | |
| 2011/0078106 A1 * | 3/2011 | Luchi et al. | 706/48 |
| 2011/0153817 A1 | 6/2011 | Wright et al. | |

OTHER PUBLICATIONS

Edward A. Addison et al., U.S. Appl. No. 13/859,560, filed Apr. 9, 2013, Office Action, Jun. 19, 2014, 14 pages.

* cited by examiner

*Primary Examiner* — Bryan Bui
(74) *Attorney, Agent, or Firm* — Marcia L. Doubet

(57) ABSTRACT

Performance data for a healthy system is captured and used to create benchmarks that represent behavior of the computing environment in a healthy state. Current behavior (e.g, run-time characteristics) of the computing environment are monitored in an on-going manner, and are compared to the benchmarks. When a benchmark is violated, performance data capture is dynamically and automatically enabled. Or, if performance data is already being captured, then performance data capture may be enabled for a larger subset of possible data. Optionally, performance data capture may be automatically disabled upon detecting that the current behavior of the computing environment has returned to a healthy state where benchmarks are no longer violated.

18 Claims, 5 Drawing Sheets

AUTOMATED ENABLEMENT OF PERFORMANCE DATA COLLECTION

BACKGROUND

The present invention relates to computing systems, and deals more particularly with performance management in such computing systems, whereby performance data capture is automatically and dynamically enabled.

Many software products provide the ability to capture data pertaining to system performance and throughput. There is a trade-off to gathering such data, however, since the act of doing so is a performance and throughput cost to the system. That is, CPU usage will increase due to gathering and capturing the data, and the elapsed time for applications executing in the system will increase, resulting in reduced throughput.

BRIEF SUMMARY

The present invention is directed to performance management in computing systems. In one aspect, this comprises dynamically and automatically enabling performance data capture in a computing environment by: iteratively monitoring current run-time characteristics of the computing environment and comparing the current run-time characteristics to previously-recorded information describing characteristics of the computing environment when operating in a healthy state; and responsive to detecting, from the comparing, that the computing environment is not operating in the healthy state, programmatically causing the processor to begin capturing performance data pertaining to ongoing current run-time characteristics of the computing environment or, if the processor is already capturing the performance data and a further level of detail is available for the capturing, then causing the processor to begin capturing the performance data at the further level of detail. Optionally, if the comparing detects that the computing environment has returned to operating in the healthy state, the capturing of the performance data may be stopped or set to capture a smaller subset of possible data.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

DETAILED DESCRIPTION

Figure 1:
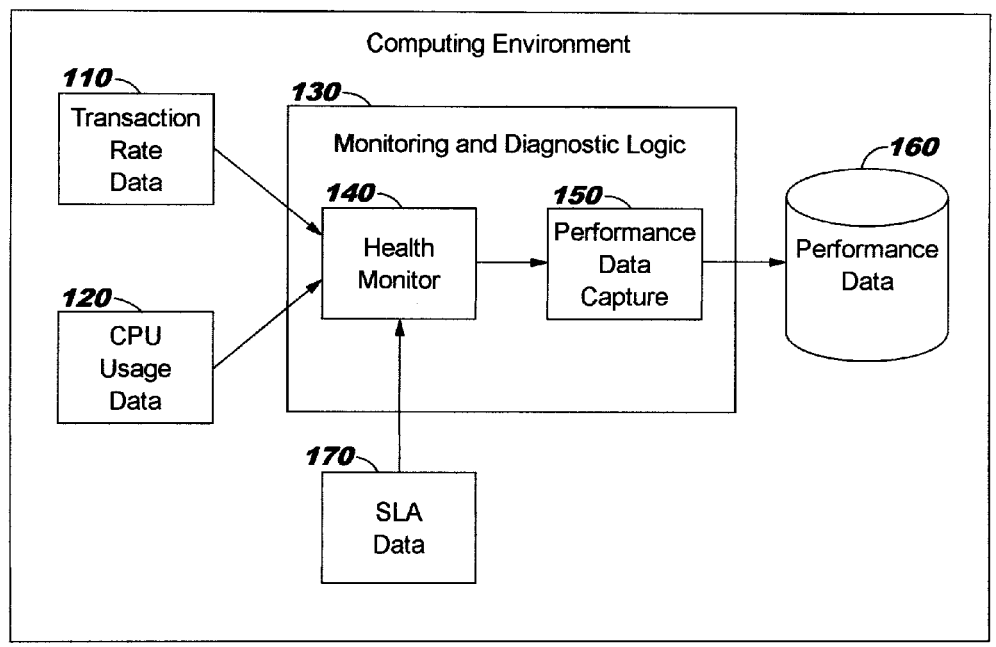
FIG. 1 illustrates a computing environment in which system health is monitored, and in which diagnostic data may be automatically and dynamically enabled, according to an embodiment of the present invention.

As noted earlier, many software products provide the ability to capture data pertaining to system performance and throughput, although this results in a performance and throughput cost to the system. Computing overhead and path lengths are typically increased, and applications executing in the computing environment may suffer response time degradation. In some computing environments, costs are billed to individual departments or groups based on the amount of CPU time consumed to run applications for the department or group, and thus capturing performance and throughput data also results in added expense in these environments. (The term "performance data" is used herein for ease of reference, and encompasses various types of data that may be deemed useful to capture—including, but not limited to, performance data, throughput data, and diagnostic data. In addition, the term "capture" is used herein for ease of reference when referring to performance data, and is intended to encompass the gathering of performance data as well as the recording of such data in a persistent repository.)

An example of a system that provides for capturing run-time performance data is the CICS® Transaction Processing software from International Business Machines Corporation ("IBM"). ("CICS" is a registered trademark of IBM in the United Status, other countries, or both.) Selected example scenarios will be discussed herein with reference to the CICS Transaction Processing software.

CICS Transaction Processing, hereinafter referred to as "TP" for ease of reference, may run in an environment supported by IBM's z/Series® operating system. ("z/Series" is a registered trademark of IBM in the United Status, other countries, or both.) In this environment, the captured performance data is typically recorded as records in a repository referred to as "SMF" (which is an abbreviation for "System Management Facility"). A number of different types of SMF records may be generated by various subsystems. The SMF records generated in a CICS TP system, for example, have record number 110, which serves to identify to a particular record definition format.

In a CICS environment, the captured performance data is referred to generally as "monitoring" data, although as noted earlier, the term "performance data" is used herein to refer generally to the data that may be gathered and captured by an embodiment of the present invention.

Performance data may be captured at various levels of an executing system, including, by way of example, overall system data, application-specific data, and task-specific data for tasks within an application. Collections of applications may be considered as sub-systems within the computing environment, and performance data may also be captured for sub-systems. When a failure or system slowdown occurs—for example, a system failure or failure of a particular application—it is typically necessary to analyze the captured performance data in an attempt to determine the cause and/or the solution for the failure. In some cases, the analysis is performed by personnel who are responsible for operating the computing environment, and in other cases, the vendor of the failed software may perform this analysis in addition, or instead.

Performance data can represent a very wide range of information relating to the general execution behavior of a given computing environment. This may include, by way of example, the amount of CPU usage for a particular task, the number of task switches performed by the operating system, the elapsed time (as measured by so-called "wall clock" time) that a particular task was running, and so forth.

Because of the added computing overhead of capturing performance data, however, users may choose to run their production system with performance data capture disabled. Or, they might configure the performance data capture to only record a minimum set of the possible data items that could otherwise be captured.

Users are generally aware that turning performance data capture on, and enabling performance data capture at a fine level of detail (e.g., by capturing all or most of the available data items), makes problem determination much easier. Having this amount of performance data available can assist both the personnel who are responsible for operating the computing system, and the vendor, when the vendor is involved with problem determination. However, when the computing environment does not suffer a failure or slowdown, then there is generally no problem to be analyzed, and the cost of performance data capture may seem unwarranted. The exposure that results from not capturing performance data, or not capturing performance data at a sufficient level of detail, is that if a problem does occur, the resulting debugging effort may be greatly increased and it may even be impossible to resolve the cause of some problems.

Modern computing environments generally attempt to achieve a policy known as "first failure data capture" (also referred to herein as "FFDC"), whereby the data needed to resolve a problem is captured when the computing environment first experiences a particular failure or slowdown. This avoids the need to halt productive work in the system while an attempt is made to recreate the problem and capture data from this newly-created failure.

Lack of captured performance data is particularly troublesome and problematic when an apparently-healthy system suffers an unexplained degradation in its performance or throughput. As a result, there is little evidence to help explain the cause of the slowdown or failure (e.g., such as an increase in CPU usage). As the personnel attempt to recreate the problem, they generally must first modify system settings to enable a level of performance data capture that is expected to be useful, to increase the likelihood that the problem can be debugged from this captured performance data. This after-the-fact approach violates the FFDC policy, however, and leads to an increase in problem resolution time. In addition, this after-the-fact approach results in added costs because system resources are diverted from performing actual production-level work.

In addition to the added cost of capturing performance data, it may be infeasible in some situations for the performance data to be stored until needed. A particular computing environment, for example, might have insufficient storage space. Furthermore, if a relatively large amount of performance data has been collected, the time required for problem resolution personnel to receive the data and to traverse it to locate the period of interest, for the entity of interest, may be quite substantial.

An embodiment of the present invention provides an alternative to known techniques, whereby performance data for a healthy system is captured and used to create benchmarks that represent behavior of the computing environment in a healthy state. The benchmarks may be in the form of rules used by a rules analyzer, for example. As one example of a benchmark that may be used, it may be determined that the computing environment is operating at a healthy level when CPU usage is between 40 percent and 60 percent of capacity. As another example of a benchmark, it may be determined that the computing environment is operating at a healthy level when it is dispatching no more than 1,000 tasks per minutes. As yet another example, a computing environment may be deemed to be healthy as long as various metrics set out in a service level agreement ("SLA") are being met—for example, by achieving acceptable user response times, where what is "acceptable" is typically defined in the SLA by a range of response time metrics that are deemed to be acceptable in this computing environment.

The benchmarks established for use with an embodiment of the present invention are then monitored in an ongoing manner. While benchmarks are not being violated, the computing environment may operate with performance data capture disabled—or, alternatively, with performance data capture enabled only for some relatively small subset of possible data. If conditions in the computing environment violate one or more of the benchmarks, however, then the embodiment of the invention dynamically and automatically (i.e., programmatically) enables the performance data capture—or, if already enabled for a subset of data, dynamically and automatically enables performance data capture for a larger subset of possible data. If the computing environment continues to degrade, resulting in a failure or slowdown, then performance data will have been captured and will already be available for use by problem resolution personnel, thus achieving the first failure data capture policy.

Optionally, an embodiment of the present invention may additionally enable other types of data capture when a benchmark is violated, such as automatically and dynamically enabling diagnostics such as tracing of system events and operations in response to detecting the violation.

Using an embodiment of the present invention avoids the need for human intervention to activate or alter the settings for the level of performance data to be captured. The potential for human error is likewise avoided. The likelihood of gathering voluminous amounts of unneeded data may be reduced, and the likelihood of capturing data that will be needed for resolving a problem—while adhering to a first failure data capture policy—is increased. In addition, using an embodiment of the present invention may eliminate the need to recreate failure situations after the fact in order to capture relevant data for problem resolution.

An embodiment of the invention may be incorporated within logic of a system, such as CICS, that is already adapted for determining run-time characteristics such as current CPU usage, throughput, and metrics related to service level agreements. As one alternative, an embodiment of the present invention may be deployed as a separate program that performs monitoring and performance data capture as disclosed herein.

Referring now to FIG. 1, a computing environment 100 is illustrated in which monitoring and diagnostic logic 130 is comprised of a health monitor component 140 and a performance data capture component 150. In this scenario, the health monitor component 140 receives, as input, transaction rate (e.g., workload throughput) data 110, CPU usage data 120, and SLA data 170. When the health monitor 140 determines that benchmarks established for this particular computing environment 100 have been violated, the performance data capture component 150 is automatically enabled to begin capturing performance data, where this capturing will continue in an ongoing manner to capture performance data that is then recorded in a performance data repository 160. (Note that the transaction rate data 110, CPU usage data 120, and SLA data 170 are illustrated merely as examples of the type of input that may be monitored and compared to benchmarks, and an embodiment of the present invention may use any combination of these inputs, additional inputs, or different inputs.)

Figure 2:
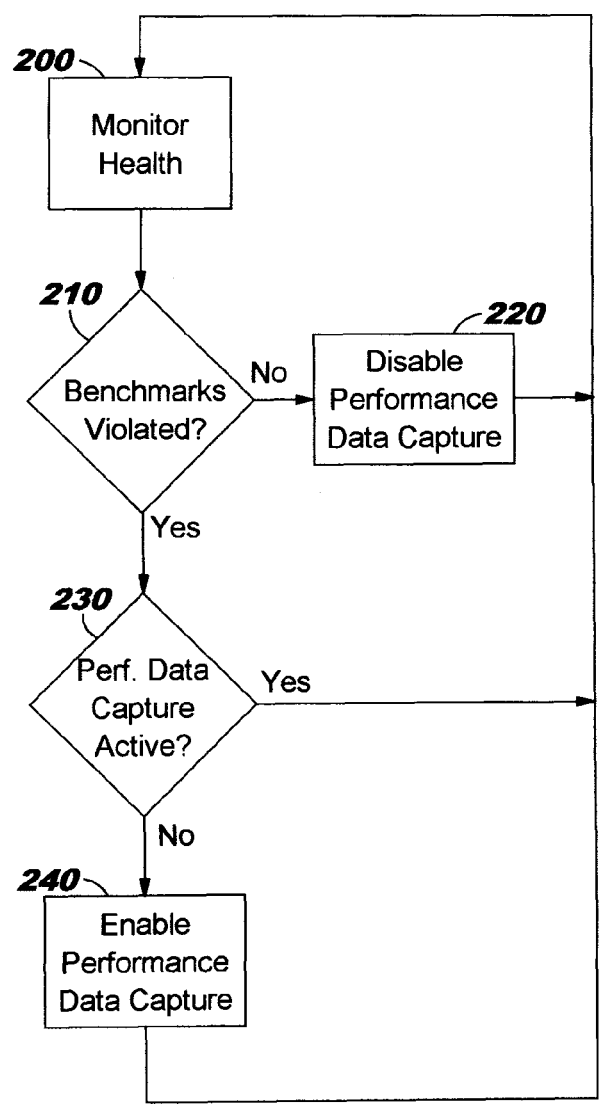
FIG. 2 provides a flowchart depicting logic which may be used when implementing an embodiment of the present invention.

FIG. 2 provides a flowchart depicting logic which may be used when implementing an embodiment of the present invention. The processing shown in FIG. 2 is preferably performed in an iterative and ongoing manner, and may be invoked periodically—for example, upon expiration of a timer—to evaluate the health (e.g., as indicated by current run-time characteristics) of a computing environment. Initially, performance data capture is preferably disabled, or set to capture a limited amount of data. The processing of FIG. 2 then monitors the health of the computing environment, as shown at Block 200. It should be noted that an embodiment of the present invention may be adapted for monitoring the computing environment as a whole, or for monitoring some subset thereof, such as individual applications or tasks.

The monitoring performed at Block 200 may obtain performance data from one or more sources, as discussed above with reference to FIG. 1. Block 210 then compares the performance data to the benchmarks established for this computing environment (or subset thereof). If this comparison indicates that the benchmarks are not violated, then Block 220 may optionally disable any previously-configured performance data capture, after which processing returns to Block 200 to continue the monitoring. This disabling may happen, for example, when a computing environment that was previously violating one or more benchmarks subsequently returns to a state where performance characteristics are deemed to be acceptable.

On the other hand, if the test at Block 210 determines that the computing environment has reached or exceeded a state where its performance warrants further attention or analysis, as detected by violating one or more of the established benchmarks, then processing continues at Block 230. For example, Block 210 might detect that the computing environment is using an excessive amount of CPU time, or that it is not meeting its expected workload throughput. Block 230 then tests whether performance data capture is already active. If so, then the data capture should continue, and processing therefore returns to Block 200.

Note that, as an alternative to returning to Block 200 following a positive result at Block 230, an embodiment of the present invention may alternatively determine whether any additional level of detail is available for performance data capture (i.e., whether a larger subset of possible data is available for capturing, as has been discussed above) and if so, then this additional level of detail may be automatically and dynamically enabled prior to returning to Block 200. Similarly, rather than disabling the capturing of all performance data at Block 220, configuration settings may be consulted to determine a smaller subset of performance data that should now be captured. (It will be obvious to those of ordinary skill in the art how this alternative processing may be incorporated into the flowchart shown in FIG. 2.)

When the test at Block 230 has a negative result, indicating that data capture is not already active, then processing reaches Block 240, which dynamically and automatically enables performance data capture. Performance data will then begin to be captured in an ongoing manner, as discussed above with reference to FIG. 1. Processing then returns to Block 200 to continue monitoring the health of the computing environment.

An embodiment of the present invention preferably allows a user to configure what types of data are used in the monitoring at Block 200. With reference to FIG. 1, for example, it might be deemed useful in a particular computing environment to monitor transaction rate data 110 and CPU usage data 120, but not SLA data 170.

Figure 3:
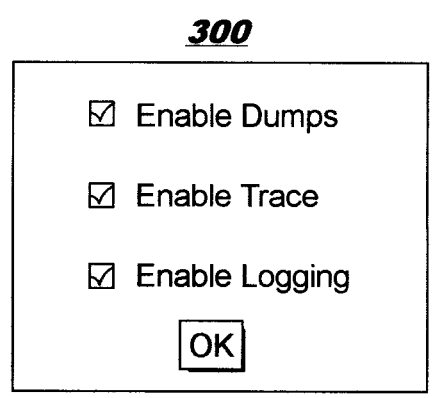
FIG. 3 illustrates a user interface that may be used for configuring settings to be used by an embodiment of the present invention when a problem is detected at run time.

An embodiment of the present invention may allow a user to configure various settings that are used when the processing at Block 240 is performed. For example, a configuration interface might be deployed such as interface 300 of FIG. 3, whereby a user can selectively enable settings for capturing system dumps, activating trace logic, and/or activating logging operations. With reference to an embodiment operating in a CICS environment, for example, configuration interface 300 may allow a user to specify that the processing of Block 240 should enable CICS system trace settings. These settings may also be used when the processing of Block 220 disables performance data capture, in order to know which settings should be disabled. Or, it may be desirable to leave the settings enabled after they are initially activated at Block 240, and an embodiment of the present invention may further allow a user to configure whether this is desired. Note that the configuration choices represented by the interface in FIG. 3 are not used at the time of detecting a problem, but rather are preset and stored, and are then consulted programmatically by an embodiment of the present invention, thereby avoiding interactive human involvement with the run-time processing performed by the logic of FIG. 2.

As a further option, an embodiment of the present invention may learn from past experience, so that as a computing environment is analyzed for performance issues, a database of typical situations is produced. For example, it may happen that the most common situation that warrants capturing performance data involves the dispatching of more than a certain number of transactions, of a particular type, within the CICS environment. An embodiment of the present invention may therefore maintain a knowledge base of typical combinations which can result, or have in the past resulted, in performance degradation (including throughput issues, CPU over-usage or under-usage, etc.) or system failure. Note that the information in this knowledge base represents a non-healthy state of the computing environment (i.e., an unhealthy or potentially-impending unhealthy state), as opposed to the healthy-state information previously discussed. Accordingly, this knowledge base may be used at Block 210, for example, as an additional source for determining when the current run-time characteristics of a computing environment indicate that it is operating in an unhealthy state. By using this type of information, it may be presumed that such degradation situations are likely to recur, and an embodiment of the present invention can therefore proactively begin capturing performance data. Suppose, for example, that system performance is known to degrade when 10 transactions of type "ABCD" are executing concurrently. An embodiment of the present invention might be configured to proactively begin performance data capture when 5 of these transactions are executing concurrently. Thus, if the number of type "ABCD" transactions increases to the point that system performance actually does degrade, then performance data for use in analyzing the degradation will already be available, without the need to stop productive work in the system in order to attempt recreating the problem, and meeting the goal of first failure data capture.

As yet another option, an embodiment of the present invention may be adapted to provide feedback to personnel such as system programmers on the more likely scenarios that result in performance problems. This feedback may be useful, for example, during software development of a particular application. The feedback may be used as a type of living database, whereby information is stored pertaining to the run-time characteristics encountered for common failure scenarios of the application. This database may be used as part of an iterative support cycle which helps the programmers learn from the prior performance problems. The database may store information on individual transaction rates, CPU usage, and/or response time metrics that have been encountered in execution, with a correlation to any system slowdown or failure that occurs under such conditions. This data may be analyzed by the programmers as they improve the processing of the application (and it may also or alternatively be used to establish the benchmarks that are used during operation of Block 210 of FIG. 2). An added benefit of maintaining such a living database is that knowledge can be accumulated from execution metrics to avoid creating benchmarks that trigger false positive situations. For example, increased CPU usage may result, in some scenarios, due to a temporary workload surge rather than from an impending problem. In such scenarios, it may be undesirable to gather additional performance data, and an embodiment of the present invention may therefore be adapted to use this type of information when determining whether benchmarks are violated.

As has been demonstrated above, an embodiment of the present invention increases the likelihood of achieving first failure data capture, avoids the need for human intervention and human error when a computing environment encounters a problem, and avoids capturing an excessive amount of unnecessary data in a healthy computing environment while still capturing data when needed. Service costs and system overhead may be reduced as a result.

Figure 4:
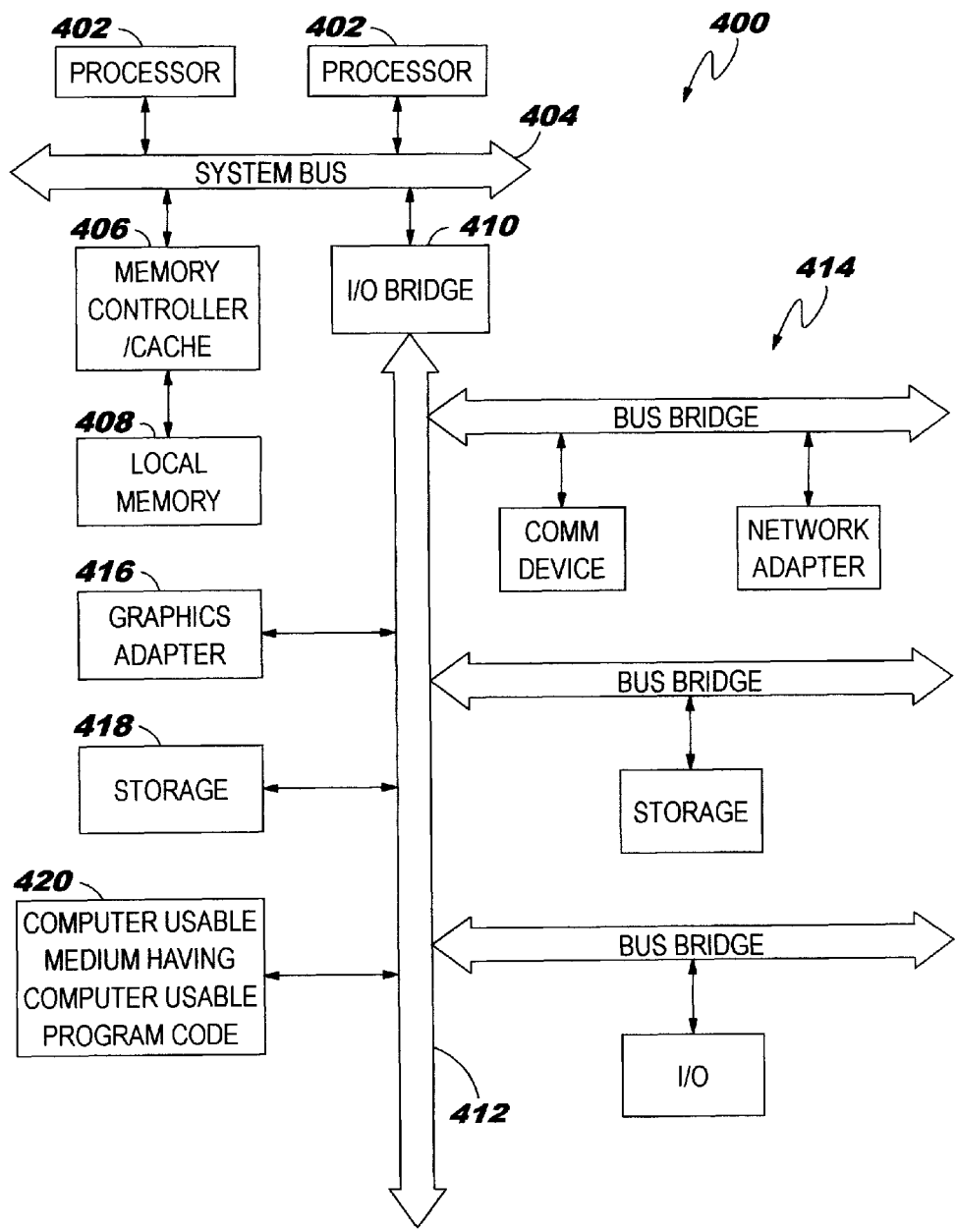
FIG. 4 depicts a data processing system suitable for storing and/or executing program code.

Referring now to FIG. 4, a block diagram of a data processing system is depicted in accordance with the present invention. Data processing system 400, which may be used for executing an embodiment of the invention described herein, may comprise a symmetric multiprocessor ("SMP") system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses 414 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418, and a computer usable storage medium 420 having computer usable program code embodied thereon. The computer usable program code may be executed to execute any aspect of the present invention, as have been described herein.

The data processing system depicted in FIG. 4 may be, for example, an IBM System p® system, a product of International Business Machines Corporation in Armonk, N.Y., running the Advanced Interactive Executive (AIX®) operating system. An object-oriented programming system such as Java may run in conjunction with the operating system and provides calls to the operating system from Java® programs or applications executing on data processing system. ("System p" and "AIX" are registered trademarks of International Business Machines Corporation in the United States, other countries, or both. "Java" is a registered trademark of Oracle America, Inc., in the United States, other countries, or both.)

Figure 5:
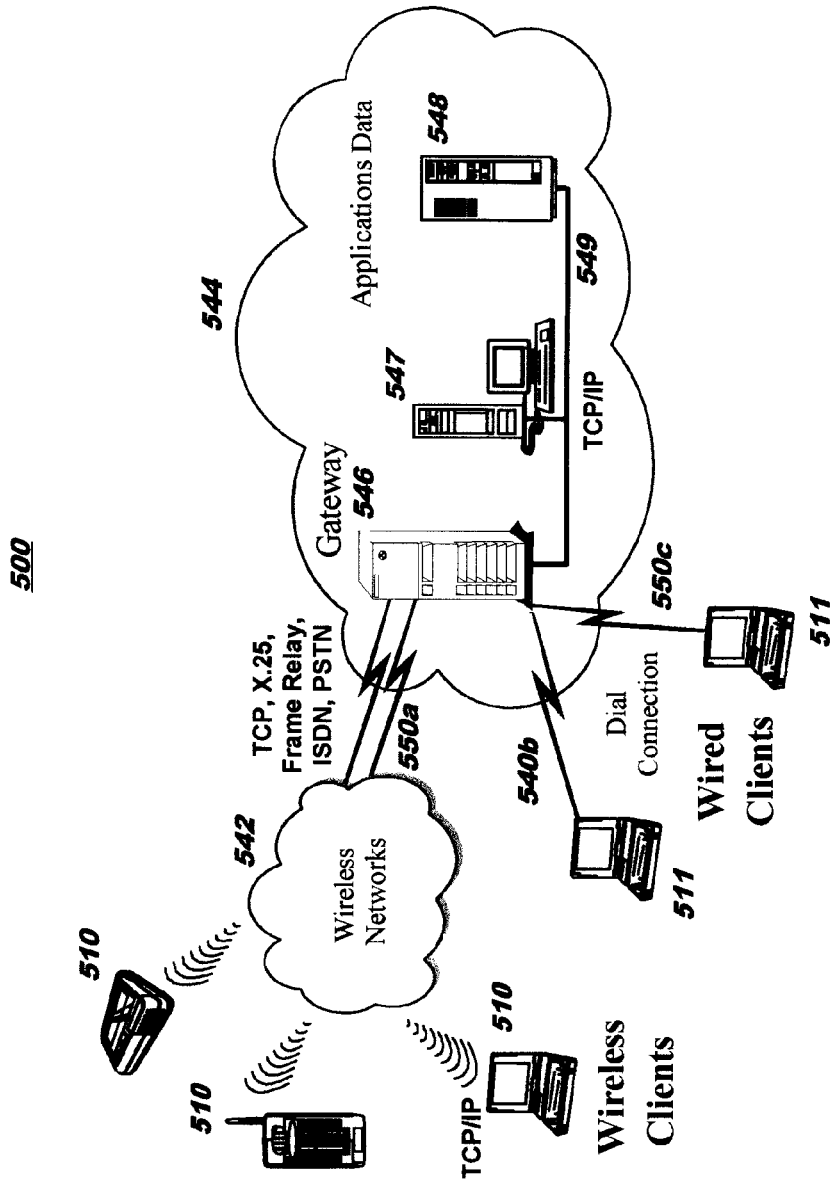
FIG. 5 depicts a representative networking environment in which one or more embodiments of the present invention may be used.

FIG. 5 illustrates a data processing network environment 500 in which the present invention may be practiced. The data processing network 500 may include a plurality of individual networks, such as wireless network 542 and wired network 544. A plurality of wireless devices 510 may communicate over wireless network 542, and a plurality of wired devices, shown in the figure (by way of illustration) as workstations 511, may communicate over network 544. Additionally, as those skilled in the art will appreciate, one or more local area networks ("LANs") may be included (not shown), where a LAN may comprise a plurality of devices coupled to a host processor.

Still referring to FIG. 5, the networks 542 and 544 may also include mainframe computers or servers, such as a gateway computer 546 or application server 547 (which may access a data repository 548). A gateway computer 546 serves as a point of entry into each network, such as network 544. The gateway 546 may be preferably coupled to another network 542 by means of a communications link 550a. The gateway 546 may also be directly coupled to one or more workstations 511 using a communications link 550b, 550c, and/or may be indirectly coupled to such devices. The gateway computer 546 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks, and "System i" is a trademark, of IBM in the United States, other countries, or both.)

The gateway computer 546 may also be coupled 549 to a storage device (such as data repository 548).

Those skilled in the art will appreciate that the gateway computer 546 may be located a great geographic distance from the network 542, and similarly, the workstations 511 may be located some distance from the networks 542 and 544, respectively. For example, the network 542 may be located in California, while the gateway 546 may be located in Texas, and one or more of the workstations 511 may be located in Florida. The workstations 511 may connect to the wireless network 542 using a networking protocol such as the Transmission Control Protocol/Internet Protocol ("TCP/IP") over a number of alternative connection media, such as cellular phone, radio frequency networks, satellite networks, etc. The wireless network 542 preferably connects to the gateway 546 using a network connection 550a such as TCP or User Datagram Protocol ("UDP") over IP, X.25, Frame Relay, Integrated Services Digital Network ("ISDN"), Public Switched Telephone Network ("PSTN"), etc. The workstations 511 may connect directly to the gateway 546 using dial connections 550b or 550c. Further, the wireless network 542 and network 544 may connect to one or more other networks (not shown), in an analogous manner to that depicted in FIG. 5.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A system for dynamically and automatically enabling performance data capture in a computing environment, comprising:
   a computer comprising a processor; and
   instructions which are executable, using the processor, to implement functions comprising:
      iteratively monitoring current run-time characteristics of the computing environment and comparing the current run-time characteristics to previously-recorded information describing characteristics of the computing environment when operating in a healthy state;
      responsive to detecting, from the comparing, that the computing environment is not operating in the healthy state, determining whether the processor is already capturing performance data pertaining to ongoing current run-time characteristics of the computing environment;
      responsive to determining that the processor is not already capturing the performance data, programmatically causing the processor to begin capturing the performance data; and responsive to determining that the processor is already capturing the performance data, determining whether a further level of detail is available for the capturing, and responsive to determining that the further level of detail is available, then programmatically causing the processor to begin capturing the performance data at the further level of detail.

2. The system according to claim 1, wherein the functions further comprise:
responsive to detecting, from a subsequent iteration of the monitoring and the comparing, that the computing environment has returned to operating in the healthy state, programmatically causing the processor to stop capturing the performance data.

3. The system according to claim 1, wherein the programmatically causing the processor to begin capturing the performance data, and the programmatically causing the processor to begin capturing the performance data at the further level of detail, further comprise programmatically consulting previously-stored settings to determine which performance data to include in the capturing.

4. The system according to claim 1, wherein the current run-time characteristics comprise at least one of CPU usage and workload throughput.

5. The system according to claim 1, wherein:
the previously-recorded information comprises metrics defined in a service level agreement; and
the comparing compares the current run-time characteristics to the metrics defined in the service level agreement.

6. The system according to claim 1, wherein the functions further comprise:
responsive to detecting, from a subsequent iteration of the monitoring and the comparing, that the computing environment has returned to operating in the healthy state, programmatically consulting previously-stored settings to determine which performance data to stop capturing and then programmatically causing the processor to stop capturing the determined performance data.

7. The system according to claim 1, wherein:
the previously-recorded information further describes characteristics of the computing environment when operating in a non-healthy state;
the comparing further comprises comparing the current run-time characteristics to the previously-recorded information describing the characteristics of the computing environment when operating in the non-healthy state; and
the detecting detects that the computing environment is not operating in the healthy state when the comparing fails to match the current run-time characteristics to the characteristics describing the healthy state and also when the comparing matches the current run-time characteristics to the characteristics describing the non-healthy state.

8. The system according to claim 7, wherein the previously-recorded information describing the characteristics of the computing environment when operating in the non-healthy state comprises a collection of information describing past situations in which performance of the computing environment degraded or failed.

9. The system according to claim 1, wherein levels of detail defined as available for the capturing comprise system-level, application-level, and task-level.

10. A computer program product for dynamically and automatically enabling performance data capture in a computing environment, the computer program product comprising:
a non-transitory computer readable storage medium having computer readable program code embodied therein, the computer readable program code configured for:
iteratively monitoring current run-time characteristics of the computing environment and comparing the current run-time characteristics to previously-recorded information describing characteristics of the computing environment when operating in a healthy state;
responsive to detecting, from the comparing, that the computing environment is not operating in the healthy state, determining whether the processor is already capturing performance data pertaining to ongoing current run-time characteristics of the computing environment;
responsive to determining that the processor is not already capturing the performance data, programmatically causing the processor to begin capturing the performance data; and
responsive to determining that the processor is already capturing the performance data, determining whether a further level of detail is available for the capturing, and responsive to determining that the further level of detail is available, then programmatically causing the processor to begin capturing the performance data at the further level of detail.

11. The computer program product according to claim 10, wherein the computer readable program code is further configured for:
responsive to detecting, from a subsequent iteration of the monitoring and the comparing, that the computing environment has returned to operating in the healthy state, programmatically consulting previously-stored settings to determine which performance data to stop capturing and then programmatically causing the processor to stop capturing the determined performance data.

12. The computer program product according to claim 10, wherein the programmatically causing the processor to begin capturing the performance data, and the programmatically causing the processor to begin capturing the performance data at the further level of detail, further comprise programmatically consulting previously-stored settings to determine which performance data to include in the capturing.

13. The computer program product according to claim 10, wherein the current run-time characteristics comprise at least one of CPU usage and workload throughput.

14. The computer program product according to claim 10, wherein:
the previously-recorded information comprises metrics defined in a service level agreement; and
the comparing compares the current run-time characteristics to the metrics defined in the service level agreement.

15. The computer program product according to claim 10, wherein the computer readable program code is further configured for:
responsive to detecting, from a subsequent iteration of the monitoring and the comparing, that the computing environment has returned to operating in the healthy state, programmatically causing the processor to stop capturing the performance data.

16. The computer program product according to claim 10, wherein:
the previously-recorded information further describes characteristics of the computing environment when operating in a non-healthy state;
the comparing further comprises comparing the current run-time characteristics to previously-recorded information describing the characteristics of the computing environment when operating in the non-healthy state; and the detecting detects that the computing environment is not operating in the healthy state when the comparing fails to match the current run-time characteristics to the characteristics describing the healthy state and also when the comparing matches the current run-time characteristics to the characteristics describing the non-healthy state.

17. The computer program product according to claim 16, wherein the previously-recorded information describing the characteristics of the computing environment when operating in the non-healthy state comprises a collection of information describing past situations in which performance of the computing environment degraded or failed.

18. The computer program product according to claim 10, wherein levels of detail defined as available for the capturing comprise system-level, application-level, and task-level.

\* \* \* \* \*